United States Patent
Monica et al.

(10) Patent No.: US 10,156,853 B2
(45) Date of Patent: Dec. 18, 2018

(54) GROUP FOR LOCALIZING A MOVING TARGET IN A WAREHOUSE WITH AUTOMATIC GUIDED VEHICLES

(71) Applicant: Elettric 80 S.p.A., Viano (Reggio Emilia) (IT)

(72) Inventors: Stefania Monica, Viano (IT); Gianluigi Ferrari, Viano (IT); Massimiliano Magnani, Viano (IT); Fabio Oleari, Viano (IT); Francesco De Mola, Viano (IT)

(73) Assignee: ELECTRIC 80 S.P.A., Viano (Reggio Emilia) (IT)

( * ) Notice: Subject to any disclaimer, the term of this patent is extended or adjusted under 35 U.S.C. 154(b) by 168 days.

(21) Appl. No.: 15/088,734

(22) Filed: Apr. 1, 2016

(65) Prior Publication Data

US 2016/0291597 A1 Oct. 6, 2016

(30) Foreign Application Priority Data

Apr. 2, 2015 (IT) .............................. 102015000010875

(51) Int. Cl.
| | |
|---|---|
| *G01S 13/42* | (2006.01) |
| *G01S 5/00* | (2006.01) |
| *G01S 5/10* | (2006.01) |
| *G05D 1/02* | (2006.01) |
| *G01S 13/87* | (2006.01) |
| *G05D 1/00* | (2006.01) |
| *G01S 13/93* | (2006.01) |

(52) U.S. Cl.
CPC .............. *G05D 1/0268* (2013.01); *G01S 5/10* (2013.01); *G01S 13/878* (2013.01); *G05D 1/0088* (2013.01); *G01S 2013/9339* (2013.01); *G01S 2013/9375* (2013.01); *G01S 2013/9378* (2013.01)

(58) Field of Classification Search
None
See application file for complete search history.

(56) References Cited

U.S. PATENT DOCUMENTS

| | | |
|---|---|---|
| 6,522,288 B1 | 2/2003 | Paradie et al. |
| 6,628,227 B1 | 9/2003 | Rao et al. |
| 6,727,844 B1 | 4/2004 | Zimmermann et al. |
| 8,478,292 B2 * | 7/2013 | Kim .......................... G01S 5/14 |
| | | 342/451 |

(Continued)

FOREIGN PATENT DOCUMENTS

| | | |
|---|---|---|
| DE | 102012214201 | 5/2014 |
| DE | 102014013084 | 3/2015 |

OTHER PUBLICATIONS

International search report issued for Italian application No. 102015000010875 dated Dec. 15, 2015.

(Continued)

*Primary Examiner* — Thomas G Black
*Assistant Examiner* — Demetra R Smith-Stewart
(74) *Attorney, Agent, or Firm* — Tutunjian & Bitetto, P.C.

(57) ABSTRACT

The present invention relates to a localization or position estimation group for a moving target, such as a person or a manual guided vehicle, in a warehouse or in an area to be monitored with at least one automatic guided vehicle, equipped with a unit for controlling the movement of the automatic guided vehicle itself, and at least one moving target.

19 Claims, 1 Drawing Sheet

(56) References Cited

U.S. PATENT DOCUMENTS

| | | | | |
|---|---|---|---|---|
| 8,643,536 B2* | 2/2014 | Cavirani | ................ | G01S 7/024 342/118 |
| 2010/0023195 A1* | 1/2010 | Traster | ................ | G01S 15/025 701/23 |
| 2016/0195602 A1* | 7/2016 | Meadow | ................ | G01S 5/10 701/517 |
| 2016/0378117 A1* | 12/2016 | Szatmary | ................ | B25J 5/00 382/153 |

OTHER PUBLICATIONS

Endah S. Ningrum, et al., The Application of an Hybrid Trilateration Method for Multi-Robot Localization System, Proceeding of National Seminar on Applied Technology, Science, and Arts (1st APTECS), Surabaya, Dec. 22, 2009.

* cited by examiner

GROUP FOR LOCALIZING A MOVING TARGET IN A WAREHOUSE WITH AUTOMATIC GUIDED VEHICLES

TECHNICAL FIELD OF THE INVENTION

The present invention relates to a localisation group for a moving target in a warehouse with automatic guided vehicles, as well as a method of localization for a moving target, with the term moving target meaning persons, forklift trucks or manual guided vehicles or TN, etc., which move in the warehouse together with the automatic guided vehicles.

STATE OF THE ART

Typically, the localisation of moving objectives or targets such as persons, forklift trucks or manual guided vehicles moving in warehouse or industrial areas in general, is carried out by arranging a plurality of antennas at fixed nodes, called anchors (in English anchor nodes), which send the detected signals to a centralized controller that uses the received signals to estimate—through triangulation algorithms and possible evolution thereof—the position of the moving target and, accordingly, signal such position to the control unit of the automatic guided vehicles, in order to avoid the collision of the automatic guided vehicles, for example LGV (Laser guided vehicle) or AGV (automatic guided vehicle), with the moving target.

Such system requires the installation of a plurality of antennas, called anchors or nodes or anchor nodes, in the area of interest, usually a warehouse, thereby involving high installation costs, as well as a complex handling of the communications between the moving targets, the nodes or the anchors, the controller of the nodes and the control unit of the automatic guided vehicles.

DE102014013084A1 relates to a method and a system for driving a vehicle, in particular a vehicle with no driver or an automatic guided vehicle.

U.S. Pat. No. 6,522,288B1, U.S. Pat. No. 6,628,227B1 and U.S. Pat. No. 6,727,844B1 teach the use of moving targets localisation techniques, yet for manual driven vehicles.

DE102012214201A1 teaches another solution according to the state of the art.

The scientific article by Endah S. Ningrum et al. "The Application of an Hybrid Trilateration Method for Multi-Robot Localization System" (22 Dec. 2009, XP055235680) discloses an application of multi-robot mutual localisation which provides for the use of a sonar.

SUMMARY OF THE INVENTION

One object of the present invention is to provide for an improved localisation or position estimation group for a moving target, such as a person or a manual guided vehicle in a warehouse with automatic guided vehicles.

Another object of the present invention is to provide for a localisation or position estimation group for a moving target, such as a person or a manual guided vehicle in a warehouse with automatic guided vehicles, which is able to localize or detect in a fast and effective way such moving target.

One further object of the present invention is to provide for a localisation or position estimation group of the type mentioned above, which is able to detect the position of a moving target, such as a person or an automatic guided vehicle and avoid the collision of automatic guided vehicles with the moving target.

Yet another object of the present invention is to provide for a localisation or position estimation group for a moving target, such as a person or a manual guided vehicle in a warehouse with automatic guided vehicles which allows to simplify the localisation group and the installation thereof.

According to one aspect of the present invention, a localisation group according to the present principles is provided.

The present application refers to preferred and advantageous embodiments of the invention.

BRIEF DESCRIPTION OF THE DRAWINGS

Other features and advantages of the invention will be more apparent from the description of one embodiment of a localisation group, given for indicative purpose in the enclosed drawings, wherein.

In the enclosed drawings, the same parts or components are associated to the same reference numbers.

DETAILED DESCRIPTION OF THE INVENTION

The present invention relates to a localisation or estimation group of the position for at least one moving target 2, such as a person, a forklift truck or a manual guided vehicle, etcetera, which is in a warehouse or in an area to be monitored, such as a production area in general, an outdoor stocking area, a port, etcetera, together with automatic guided vehicles, hereafter also referred to as AGV (Automatic guided vehicle) or LGV (Laser guided vehicle).

In the warehouse or the area to be monitored at least one automatic guided vehicle 3 is also present, which vehicle is provided with localisation means 1 for the moving target 2.

In fact, an important feature of the present invention is that the localisation means 1 for the moving target 2 are provided on the automatic guided vehicle. This feature allows to remarkably simplify the installation of the nodes with the relative antennas for detecting moving targets in the warehouse or area to be monitored, because it is not necessary anymore to place the localisation means, which usually comprise the antennas, at fixed points in the warehouse or in the area to be monitored.

Moreover, thanks to such expedient, it is possible to reduce the number of antennas required to "cover" or monitor the entire area of the warehouse or the area to be monitored, by positioning a reduced number of antennas on vehicles, if desired only on vehicles.

Moreover, in this way the antennas are positioned only where they are actually needed, i.e. where the automatic guided vehicles are.

The localisation means 1 of the vehicle 3 comprise at least two first nodes for emitting and receiving signals, each first node being provided with an antenna (not shown) for receiving/emitting signals.

The first nodes of the vehicle 3 can be more than two, for example three and, according to the embodiment shown in the figure, even four, referred to as S0, S1, S2, S3.

In general, the number of first nodes on the automatic guided vehicle 3 can be any, starting from two.

For example, two first nodes, S0 and S3, can be placed in the front F of the vehicle 3, and send signals towards the moving target 2 to be localized.

Figure 1:
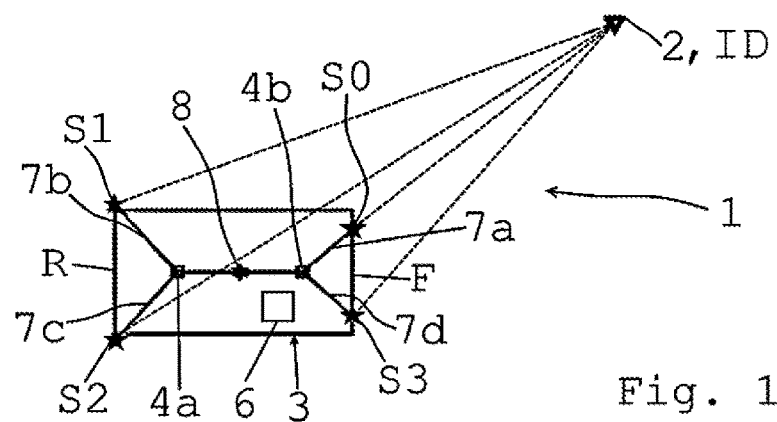
FIG. 1 shows a localisation group according to the present invention.

The moving target 2, in turn, is provided with a second node or marker, identified in FIG. 1 with the same number 2 of the moving target, the second node or marker comprising in turn at least one antenna capable of receiving/emitting signals.

According to one version of the present invention, the second node or marker is of the active type, i.e. it is always ready in reception for receiving possible interrogation signals from each vehicle 3 and this, clearly, assures fast responsiveness by the second node or marker. In order to obtain this effect, the marker can be of the type powered by a suitable electrical power system, for example one or more batteries mounted on board of the manual guided vehicle or carried by the person provided with a second node.

Accordingly, when the first nodes of vehicle 3 send signals towards the second node or marker of the moving target 2 to be localized, by the same target 2 a return signal is obtained towards the first nodes of the vehicle 3.

It is to be noted that the first nodes S0, S1, S2, S3, being placed on the automatic guided vehicle 3, are also integral with respect to each other and form a group of fixed nodes therebetween, yet nodes which move with vehicle 3.

The first nodes S0, S1, S2, S3 cooperate with each other to localize the moving node uncoupled from the fixed nodes rigid with each other, the moving node being the one on the moving target 2.

The first emitting/receiving nodes of the vehicle 3 and the marker of the moving target 2 can use electromagnetic waves of the same ultra wide band type, or UWB, or other types of transmission signals by electromagnetic waves can be used, for example Wi-Fi or Bluetooth (trademarks registered by their respective owners).

The marker of the moving target 2 can also comprise an ID identification code, which allows to distinguish a moving target 2 from another, if in the warehouse or area to be monitored several moving targets 2 are present.

According to one version not shown, each antenna of the first nodes S0, S1, S2, S3 is operated by a respective emission/reception unit.

According to one version of the present invention shown in FIG. 1, each of the first nodes S0, S1, S2, S3 comprises one antenna, and such antennas are operated in couple, by two emission/reception units 4a, 4b.

In general, in the automatic guided vehicle 3 several first nodes can be provided with respective antennas, which antennas are operated by a lower or equal number of emission/reception units. In particular, a single emission/reception unit can also operate all the antennas of the first nodes S0, S1, S2, S3 of the vehicle 3.

Vehicle 3 also comprises electrical powering means 8 for the emission/reception units 4a, 4b and/or for the programming control unit 6.

With reference to the way in which the nodes are operated by a lower number of emission/reception units, this can occur, for example, according to a time division multiplexing logic, the emission/reception units 4a and 4b thereby comprising means for carrying out the time division multiplexing of the signals from and towards the first emitting/receiving nodes S0, S1, S2, S3.

Alternatively, emission/reception units (control units) could, for example, be provided, capable of supporting two or more independent output channels and to process in parallel the signals received by the antennas.

As already stated, in the embodiment shown in FIG. 1, vehicle 3 comprises two emission/reception units 4a and 4b, as well as the first emitting/receiving nodes S0, S1, S2, S3 with the respective antennas; the emission/reception units 4a, 4b are then connected to the antennas of the first emitting/receiving nodes S0, S1, S2, S3, by transmission means 7a, 7b, 7c, 7d.

The first nodes S0, S1, S2, S3 emitting and receiving the electromagnetic waves thereby forming the anchors or nodes of virtual type, i.e. they are antennas which are operated by a lower number of emission/reception units.

More in detail, according to the example of FIG. 1, unit 4a operates the first node S1 through channel 7b, and the first node S2 through channel 7c, while unit 4b operates the first node S0 through channel 7a, and lastly the first node S3 through channel 7d.

In this way, the advantage of a reduction of components cost is obtained, since the antennas are less expensive with respect to the nodes equipped with emission/reception units, and a more easy handling of the signals coming from the nodes is also achieved, given that each unit 4a or 4b is able to coordinate independently the virtual nodes to which it is connected.

The connections between nodes and the units 4a, 4b can, for example, be obtained by means of extensions (cables), even if connections of other types could be provided, if desired wireless.

The automatic guided vehicle 3 comprises in addition a controller or programming control unit 6 in connection with the emission/reception units 4a, 4b, in order to control the emission and the reception of detection signals of the first nodes S0, S1, S2, S3 and, thus, calculate the position of the moving target 2, through a trilateration between the involved nodes.

Nodes S0, S1, S2, S3 can be positioned two at the front or first front F of the vehicle and two at the rear or second front R of the vehicle. In particular, each node can be provided close to an angle of the vehicle 3 outline, considering the plan view of the vehicle outline as approximately a rectangle, thereby allowing a geometrical position of the nodes on the vehicle more favorable in order to carry out the trilateration or multilateration or measure the geometrical position with respect to the moving target 2.

Of course, the nodes could be positioned also in a way different from the one described above, for example as a cross or according to other suitable arrangement.

The localisation group 1 according to the invention therefore allows to localize or appropriately estimate the position of a moving target, thanks to the antennas of the nodes installed on each automatic guided vehicle.

According to one version of the present invention, some nodes could be added, with the respective antennas, at fixed points of the warehouse (not shown), in order to improve the localisation of the moving target, since, at certain positions and according to certain configurations of the warehouse, the localisation of the moving target with the only nodes positioned on the automatic guided vehicle could show lower precision than the necessary one. Thus for example, in the corridors, vehicles and the obstacles/objectives are less in number (thus less "density"), while in the shipping areas many vehicles and many obstacles/objectives are usually present. Therefore a higher localisation precision is necessary.

There is anyway a notable simplification with respect to the solutions with the net of localisation nodes, placed at fixed points of the warehouse or area to be monitored.

It should be noted that automatic guided vehicles are connected to a centralized control device which handles the movement thereof and, thus, perfectly knows the position at each instant of each automatic guided vehicle. Such position is for example estimated by integrating odometry and laser scanning or other systems (for example vision system for line-following, inertial units, etcetera) on the above mentioned vehicles, and this allows, in combination with the localisation means of the moving targets above described, an optimal and safe movement of the automatic guided vehicles in the warehouse or in the area to be monitored.

More particularly, an AGV of a group according to the present invention is localized by an independent localisation device, for example LIDAR (Laser Imaging Detection and Ranging), which provides for the polar distance of particular fixed markers, placed in the area or warehouse and mapped, from which the AGV obtains its own global position, for example by means of trilateration.

The LIDAR must be placed at a certain height from ground in order to avoid interferences and must be provided with a processing unit, thus the entire system cannot be worn by a moving individual, walking in the environment.

The position is recognized only if a considerable number of markers is constantly identified, at the same time, but in order to do this, the LIDAR is usually placed in a raised position, for example 5 m above the AGV, beyond the maximum height of possible occlusions. Thus, it will be understood how it would not be possible to install it on manual guided vehicles, because these vehicles need to move freely also where the height is lower, and in the case wherein they were provided with LIDAR it should be necessary to equip the vehicle with a further device for lowering the support that supports the LIDAR or else impacts or collisions with portions of the environment may occur.

Ultimately, the complication of installing an independent localisation device, of the LIDAR or similar type, also on persons or on manual guided vehicles, would make that solution unfeasible.

Moreover, the AGV localisation device is in communication with the centralized control device of the warehouse or area to be monitored, in order to send the latter the AGV position. Consequently, the centralized control device is informed also of the position of the moving target detected by the AGV or better by means of first nodes for emitting and receiving signals.

According to a version of the present invention, the localisation group can comprise several automatic guided vehicles 3 provided with localisation means as indicated above, the above mentioned localisation means being able to detect the position of the moving target, and also to communicate between each other or anyway with a general controller of the group, in order to obtain an efficient and safe handling of the traffic in the warehouse or area to be monitored.

According to embodiments which are not object of the present invention and therefore not described more in detail, the automatic guided vehicle 3 comprises movement means, for example, wheels or movement tracks, motor means for actuating the wheels or tracks and controlled by a control unit for the controlled movement of the vehicle in a respective warehouse.

In case, the same unit controlling the movement of the vehicle can comprise also the controller or programming control unit 6 which controls the emission/reception units 4a, 4b.

The steps of a possible localisation or position estimation method with a group according to the present invention will be now described. To this regard, the case wherein the localisation group comprises one vehicle with four nodes is considered, but, as will be understood, similar considerations are applied to a group provided with one or more vehicles, each with two or three nodes.

Figure 2:
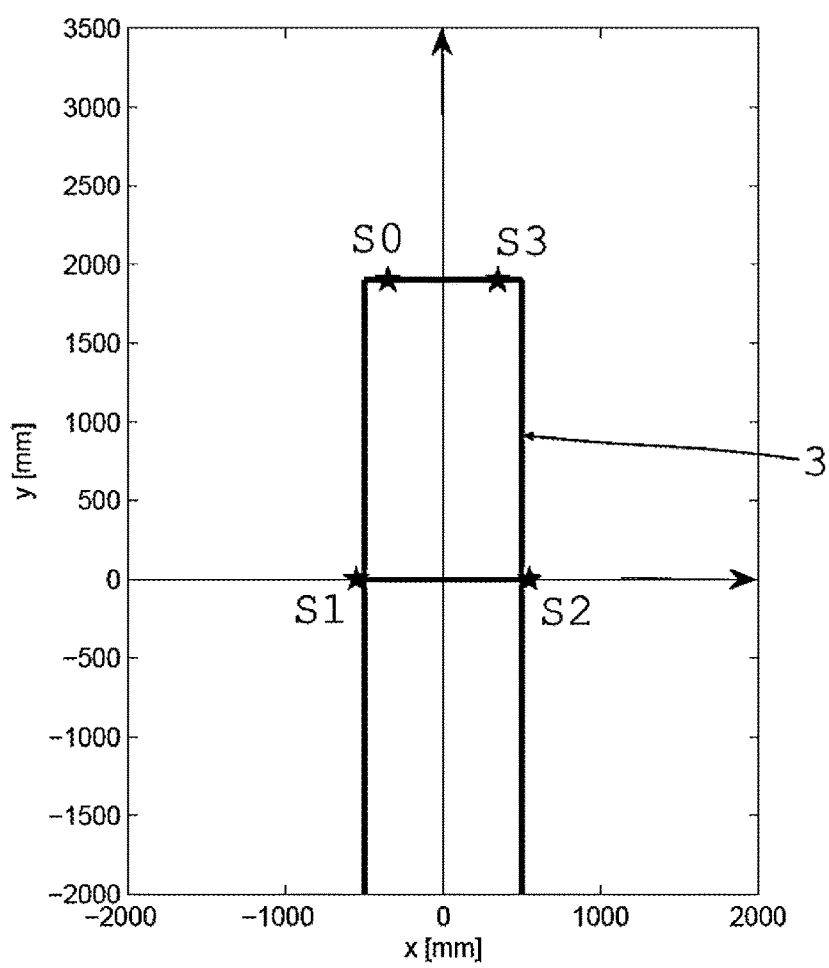
FIG. 2 shows the group of FIG. 1 in a coordinate system.

A coordinate system which could be used is that shown in FIG. 2, wherein the x axis is the line between nodes S1 and S2 (behind or on the rear R of the vehicle, for example an LGV) and the origin is the intermediate point between S1 and S2. In the considered coordinate system, the nodes coordinates on board, expressed in millimeters, are:

$$S0=[-350,1900] S1=[-550,0] \quad (2.1)$$

$$S2=[550,0] S3=[350,1900] \quad (2.2)$$

1. Localisation Scheme

A number of localisation or position estimation algorithms were implemented, which imply two steps:
  acquisition of the distance of the marker 2 by means of the four nodes S0, S1, S2 and S3 antennas signals; and
  processing of the signals for obtaining the position estimation of the moving target 2.

In particular, in the case wherein more than one objective is to be detected, such as a manual vehicle, a further step is provided, which is carried out before the other two now cited, i.e. a detection or discovery step of the objectives in the operating range of a node, in particular a so called master node, which will be discuss below.

The distance acquisition step will described first.

In all the considered algorithms, when the vehicle, for example a LGV, is static or moving forward, node S0 acts as a master node in the odd iterations and node S3 acts as master node in the even iterations, while, when the LGV moves backwards, node S1 acts as master node in the odd iterations and node S2 acts as master node in the even iterations.

During the discovery phase (mainly for multi-target scenarios), the master node interrogates in sequence all possible mobile targets, whose existence in the system is assumed known a priori. The output of the discovery phase is the list of the only mobile targets present within the action range of the master node. The subsequent steps are repeated for all and only the moving targets thus identified.

The schema for the acquisition phase of the distance is the following:
  all nodes S0, S1, S2, S3 are in the sleeping state;
  the master node is activated;
  the master node sends signals in the automated warehouse network until it receives the response from the marker or ID—in the event that is provided an identification code—of a mobile target 2;
  once the master node receives the response from the marker or a moving target ID 2, it is placed in the sleeping state and activates the slave node S11;
  the slave node S11 interrogates the marker or mobile target ID 2 which had responded to the master node;
  the slave node S11 is placed in the sleeping state and activates the slave node S12;
  the slave node S12 queries the marker or mobile target ID 2 which had responded to the master node;
  the slave node S12 is placed in the sleeping state and activates the slave node S13;
  the slave node S13 queries the marker or mobile target ID 2 which had responded to the master node;
  the slave node S13 is placed in the sleeping state.

The S13 slave node is the node or end at a node of the antenna connected to the same emission/receiving unit of the master node, while the slave node S12 and the slave node S11 are the two nodes connected to the other emission/receiving unit, and the slave node S11 is on the same side of the master node.

Therefore, the following configurations are the only possible:

- with the vehicle 3 that moves forward, odd iterations: the node S0 is the master node, the node S3 is the first slave node, the node S1 is the second slave node and the node S2 is the third slave node;
- with the vehicle 3 that moves forward, even iterations: the node S3 is the master node, the node S0 is the first slave node, the node S2 is the second slave node and the node S1 is the third slave node;
- with the vehicle 3 that moves backward, odd iterations: the node S1 is the master node, the node S2 is the first slave node, the node S0 is the second slave node and the node S3 is the third slave node; and
- with the vehicle 3 that moves backward, even iterations: the node S2 is the master node, the node S1 is the first slave node, the node S3 is the second slave node and the node S0 is the third slave node.

After receiving responses from all slave nodes, the estimating of the position begins, which will now be described.

Each estimate of the distance from each antenna of nodes S0, S1, S2, S3 is evaluated on the basis of a circumference with center at the position of the respective node and whose radius is the estimated distance, circumference which is ideally traced by the signal emitted from each antenna or node. For this reason, assuming that all the slave nodes respond, one would have four circumferences.

Designating the coordinates of the master as [xM, yM] and the slave nodes coordinates as [xs11, ys11] [xs12, ys12] [xs13, ys13], one would have:

$$CM = (x-xM)^2 + (y-yM)^2 = r^2_M \qquad (2.3)$$

$$Cs11 = (x-xs11)^2 + (y-ys11)^2 = r^2_{s11} \qquad (2.4)$$

$$Cs12 = (x-xs12)^2 + (y-ys12)^2 = r^2_{s12} \qquad (2.5)$$

$$Cs13 = (x-xs13)^2 + (y-ys13)^2 = r^2_{s13} \qquad (2.6)$$

where $r_M$, $r_{s11}$, $r_{s12}$ and $r_{s13}$ are the distances estimated from the master node, the first slave node, the second slave node and the third slave node.

The intersection of the four circumferences should give the position of the mobile target.

Because of possible errors, the four circumferences may not intersect at a single point. Of course, many strategies can be used to find the estimate of the position of the target.

Some of the possible algorithms used for this purpose will now be described.

2. Algorithm 1

2.1. This algorithm operates in the following way.

If all slave nodes respond:
- if min {vPeaks11, vPeaks12, vPeaks13}=vPeaks11 then the estimated distance from the first slave node is ignored and the localization strategy is explained in paragraph 2.4;
- if min {vPeaks11, vPeaks12, vPeaks13}=vPeaks12 then the estimated distance from the second slave node is ignored and the localization strategy is explained in paragraph 2.3;
- if min {vPeaks11, vPeaks12, vPeaks13}=vPeaks13 then the estimated distance from the third slave node is ignored and the localization strategy is explained in paragraph 2.2;

with vPeak that is the absolute maximum value in the window of the front edge of the received waveform.

vPeak represents a kind of received power, because it corresponds to the absolute maximum value detected in the main UWB impulse received. In this regard, due to reflections indoors or into a building, it is very likely that more replicas of the same transmitted impulse arrive to the receiver: among these, one is the main (the "stronger") and vPeak corresponds to its absolute maximum value (the impulse could also be negative, but with high maximum absolute value). The higher are the values for vPeak, the higher is the received power.

Consequently, high vPeak values correspond to more reliable measurements of the distance estimate, and are probably related to paths of a signal of a target in direct visibility.

2.2. If the third slave node does not respond, then CM∩Cs11 and CM∩Cs12 is evaluated.

2.2.1 If {P0, P1}=CM∩Cs11 and {Q0, Q1}=CM∩Cs12

P∈{P0, P1} and Q∈{Q0, Q1} is selected in such a way that $\|P-Q\| = \min_{i,j\in[0,1]} \|P_i - Q_j\|$ The barycenter of the two points 0.5 (P+Q) is considered as an estimate of the position of the mobile target 2.

2.2.2 If 0=CM∩Cs11 and {Q0, Q1}=CM∩Cs12 the two points P0∈CM and P1∈Cs11 are evaluated in such a way that $\|P0-P1\| = \min_{P\in CM, Q\in Cs11} \|P-Q\|$ if $\|vP0-P1\| < d_{th}$ one goes to the point 2.2.1 otherwise, as estimate of the position of the mobile target 2, the point between Q0 and Q1 with the lower x-coordinate (if the master node is S0 or S1) or greater x-coordinate (if the master node is S2 or S3) is selected.

2.2.3 If {P0, P1}=CM∩Cs11 and 0=CM∩Cs12 the two points Q0∈CM and Q1∈Cs12 are evaluated in such a way that $\|Q0-Q1\| = \min_{P\in CM, Q\in Cs12} \|P-Q\|$ if $\|Q0-Q1\| < d_{th}$ one goes to the point 2.2.1 otherwise, as estimate of the position of the mobile target 2 is selected the point between P0 and P1 with the greater y-coordinate (if the vehicle or the LGV is moving forward) or with the lower y-coordinate (if the vehicle or the LGV is moving backward).

$d_{th}$ is a threshold distance that is used in order to maximize the performances of the localization algorithm (in terms of probability of error). In other words, $d_{th}$ is a design parameter of the algorithm.

2.2.4 If 0=CM∩Cs11 and 0=CM∩Cs12 the two points Q0∈CM and Q1∈Cs12 are evaluated in such a way that $\|P0-P1\| = \min_{P\in CM, Q\in Cs12} \|P-Q\|$ the two points Q0∈CM and Q1∈Cs12 are evaluated in such a way that $\|Q0-Q1\| = \min_{P\in CM, Q\in Cs12} \|P-Q\|$ if $\|P0-P1\| \le d_{th}$ and $\|Q0-Q1\| \le d_{th}$ one goes to the point 2.2.1.

If $\|P0-P1\| \le d_{th}$ and $\|Q0-Q1\| > d_{th}$, as estimate of the position of the mobile target 2, the barycenter of the two points P0 and P1, that is 0.5 (P0+P1) is selected.

If $\|P0-P1\| > d_{th}$ and $\|Q0-Q1\| \le d_{th}$, as estimate of the position of the mobile target 2, the barycenter of the two points Q0 and Q1, that is 0.5 (Q0+Q1) is selected.

If $\|P0-P1\| > d_{th}$ and $\|Q0-Q1\| > d_{th}$, the position of the mobile target 2 is set equal to [0, 0].

2.3. If the second slave node does not respond, then $CM \cap Cs11$ and $CM \cap Cs13$ is evaluated.

2.3.1 If $\{P0, P1\} = CM \cap Cs11$ and $\{Q0, Q1\} = CM \cap Cs13$ $P \in \{P0, P1\}$ and $Q \in \{Q0, Q1\}$ are selected in such a way that $\|P-Q\| = \min_{i,j \in [0,1]} \|Pi-Qj\|$ The barycenter of the two points $0.5\,(P+Q)$ is considered as an estimate of the position of the mobile target 2.

2.3.2 If $0 = CM \cap Cs11$ and $\{Q0, Q1\} = CM \cap Cs13$ the two points $P0 \in CM$ and $P1 \in Cs11$ are evaluated in such a way that $\|P0-P1\| = \min_{P \in CM, Q \in Cs11} \|P-Q1\|$ if $\|P0-P1\| < d_{th}$ one goes to 2.3.1 otherwise, as an estimate of the position of the mobile target 2 is selected the point between Q0 and Q1 with the higher x-coordinate (if the master node is S0 or S1) or the lower x-coordinate (if the master node is S2 or S3).

2.3.3 If $\{P0, P1\} = CM \cap Cs11$ and $0 = CM \cap Cs13$ as an estimate of the position of the mobile target 2 is selected the point between P0 and P1 with the greater y-coordinate (if the vehicle or the LGV is moving forward) or with the lower y-coordinate (if the vehicle or the LGV is moving backward).

2.3.4 If $0 = CM \cap Cs11$ and $0 = CM \cap Cs13$ the two points $P0 \in CM$ and $P1 \in Cs11$ are evaluated in such a way that $\|P0-P1\| = \min_{P \in CM, Q \in Cs11} \|P-Q\|$ If $\|P0-P1\| \leq d_{th}$ one goes to 2.3.3 otherwise, the position of the mobile target 2 is set equal to [0, 0].

2.4 If the first slave node does not respond, then $CM \cap Cs12$ and $CM \cap Cs13$ is evaluated.

2.4.1 If $\{P0, P1\} = CM \cap Cs12$ and $\{Q0, Q1\} = CM \cap Cs13$ $P \in \{P0, P1\}$ and $Q \in \{Q0, Q1\}$ are selected in such a way that $\|P-Q\| = \min_{i,j \in [0,1]} \|Pi-Qj\|$ The barycenter of the two points $0.5\,(P+Q)$ is considered as an estimate of the position of the mobile target 2.

2.4.2 If $0 = CM \cap Cs12$ and $\{Q0, Q1\} = CM \cap Cs13$ $P0 \in CM$ and $P1 \in Cs12$ are evaluated in such a way that $\|P0-P1\| \min_{P \in CM, Q \in Cs11} \|P-Q\|$ if $\|P0-P1\| < d_{th}$ one goes to the point 2.4.1 otherwise, as an estimate of the position of the mobile target 2 is selected the point between Q0 and Q1 with the lower x-coordinate (if the master node is S0 or S1) or the greater x-coordinate (if the master node is S2 or S3).

2.4.3 If $\{P0, P1\} = CM \cap Cs12$ and $0 = CM \cap Cs13$ as an estimate of the position of the mobile target 2 is selected the point between P0 and P1 with the lower x-coordinate (if the master node is S0 or S1) or with the grater x-coordinate (if the master node is S2 or S3).

2.4.4 If $0 = CM \cap Cs12$ and $0 = CM \cap Cs13$ the two points $P0 \in CM$ and $P1 \in Cs12$ are evaluated in such a way that $\|P0-P1\| = \min_{P \in CM, Q \in Cs11} \|P-Q\|$ If $\|P0-P1\| \leq d_{th}$ one goes to 2.4.3 otherwise, the position of the mobile target 2 is set equal to [0, 0].

2.5 If only the first slave node responds $CM \cap Cs11$ is evaluated.

2.5.1. If $\{P0, P1\} = CM \cap Cs11$ as an estimate of the position of the mobile target 2 is selected the point between P0 and P1 with the greater x-coordinate (if the vehicle or the LGV is moving forward) or with the lower x-coordinate (if the vehicle or the LGV is moving backward).

2.5.2 If $0 = CM \cap Cs11$ the two points $P0 \in CM$ and $P1 \in Cs11$ are evaluated in such a way that $\|P0-P1\| = \min_{P \in CM, Q \in Cs11} \|P-Q\|$ If $\|P0-P1\| < d_{th}$ as an estimate of the position of the mobile target 2 is selected the barycenter of the two points P0 and P1, that is $0.5\,(P0+P1)$ otherwise, the position of the mobile target 2 is set equal to [0, 0].

2.6 If only the second slave node responds $CM \cap Cs12$ is evaluated.

2.6.1. If $\{P0, P1\} = CM \cap Cs12$ as an estimate of the position of the mobile target 2 is selected the point between P0 and P1 with the lower x-coordinate (if the master node is S0 or S1) or with the grater x-coordinate (if the master node is S2 or S3).

2.6.2 If $0 = CM \cap Cs12$ the two points $P0 \in CM$ and $P1 \in Cs11$ are evaluated so that $\|P0-P1\| = \min_{P \in CM, Q \in Cs11} \|P-Q\|$ If $\|P0-P1\| < d_{th}$ as an estimate of the position of the mobile target 2 is selected the barycenter of the two points P0 and P1, that is $0.5\,(P0+P1)$.

Otherwise, the position of the mobile target 2 is set equal to [0, 0].

2.7 If only the third slave node responds $CM \cap Cs13$ is evaluated.

2.7.1. If $\{P0, P1\} = CM \cap Cs13$ as an estimate of the position of the mobile target 2 is selected the point between P0 and P1 with the greater x-coordinate (if the master node is S0 or S1) or with the lower x-coordinate (if the master node is S2 or S3).

2.7.2 If $0 = CM \cap Cs13$, the position of the mobile target 2 is set equal to [0, 0].

2.8 If none of the slave node responds, the position of the mobile target 2 is set equal to [0, 0].

3. Algorithm 2

The algorithm 2 presents points 5, 6, 7 and 8 corresponding to points 5, 6, 7 and 8 of the algorithm 1. Point 1 corresponds formally to the point 1 of the algorithm 1, but with reference to point 2, 3, 4 they operate in a different manner 3.1. If all Three Slave Nodes Respond If min $\{vPeaks11, vPeaks12, vPeaks13\} = vPeaks11$ then the estimate of the first slave node distance is ignored. The localization strategy is explained in section 3.4.

If min $\{vPeaks11, vPeaks12, vPeaks13\} = vPeaks12$ then the estimate of the first slave node distance is ignored. The localization strategy is explained in section 3.3.

If min $\{vPeaks11, vPeaks12, vPeaks13\} = vPeaks13$ then the estimate of the first slave node distance is ignored. The localization strategy is explained in section 3.2.

3.2. If the third slave node does not respond $CM \cap Cs11$ and $CM \cap Cs12$ are evaluated A. If $vPeaks11 \geq thvPeak$ and $vPeaks12 \geq thvPeak$ 3.2.1 If $\{P0, P1\} = CM \cap CS11$ and $\{Q0, Q1\} = CM \cap CS12$ $P \in \{P0, P1\}$ and $Q \in \{Q0, Q1\}$ are selected so that $\|P-Q\| = \min_{i,j \in [0,1]} \|Pi-Qj\|$ The barycenter of the two points $0.5\,(P+Q)$ is considered as an estimate of the position of the mobile target 2.

3.2.2 If $0 = CM \cap Cs11$ and $\{Q0, Q1\} = CM \cap Cs12$ the two points $P0 \in CM$ and $P1 \in Cs11$ are evaluated in such a way that $\|P0-P1\| = \min_{P \in CM, Q \in Cs11} \|P-Q\|$ If $\|P0-P1\| < d_{th}$ one goes to the point 3.2.1 otherwise, as an estimate of the position of the mobile target 2 is selected the point between Q0 and Q1 with the lower x-coordinate (if the master node is S0 or S1) or with the grater x-coordinate (if the master node is S2 or S3).

3.2.3 If {P0, P1}=CM∩Cs11 and 0=CM∩Cs12

The two points Q0∈CM and Q1∈Cs12 are evaluated in such a way that vQ0−Q1‖=$\min_{P \in CM, Q \in Cs12}$ ‖P−Q‖

If ‖Q0−Q1‖<$d_{th}$ one goes to the point 3.2.1 otherwise as an estimate of the position of the mobile target 2 is selected the point between P0 and P1 with the greater y-coordinate (if the LGV is moving forward) or with the lower y-coordinate (if the LGV is moving backward).

3.2.4 If 0=CM∩Cs11 and 0=CM∩Cs12

The two points P0∈CM and P1∈Cs12 are evaluated in such a way that

‖P0−P1‖=$\min_{P \in CM, Q \in Cs11}$ ‖P−Q‖

The two points Q0∈CM and Q1∈Cs12 are evaluated in such a way that

‖Q0−Q1‖=$\min_{P \in CM, Q \in Cs12}$ ‖P−Q‖

If ‖P0−P1‖≤$d_{th}$ and ‖Q0−Q1‖≤$d_{th}$ one goes to the point 3.2.1.

If ‖P0−−P1‖≤$d_{th}$ and ‖Q0−Q1‖>$d_{th}$, as estimate of the position of the mobile target 2, the barycenter of the two points P0 and P1, that is 0.5 (P0+P1) is selected.

If ‖P0−P1‖>$d_{th}$ and ‖Q0−Q1‖≤$d_{th}$, as estimate of the position of the mobile target 2, the barycenter of the two points Q0 and Q1, that is 0.5 (Q0+Q1) is selected.

If ‖P0−P1‖>$d_{th}$ and ‖Q0−Q1‖>$d_{th}$, the position of the mobile target 2 is set equal to [0,0]

B. If vPeaks11>thvPeak and vPeaks12<thvPeak one goes to the point 5, corresponding to the point 2.5 of the algorithm 1.

C. If vPeaks11<thvPeak and vPeaks12>thvPeak one goes to the point 6, corresponding to the point 2.6 of the algorithm 1.

D. If vPeaks11<thvPeak and vPeaks12<thvPeak

If vPeaks11<=vPeaks12 one goes to the point 6, corresponding to the point 2.6 of the algorithm 1.

If vPeaks11>vPeaks12 one goes to the point 5, corresponding to the point 2.5 of the algorithm 1.

3.3. If the second slave node does not respond

CM∩Cs11 and CM∩Cs13 are evaluated

A. If vPeaks11≥thvPeak and vPeaks13≥thvPeak 3.3.1 If {P0, P1}=CM∩Cs11 and {Q0, Q1}=CM∩Cs13

P∈{P0, P1} and Q∈{Q0, Q1} are selected so that

‖P−Q‖=$\min_{i,j \in [0,1]}$‖Pi−Qj‖

The barycenter of the two points 0.5 (P+Q) is considered as an estimate of the position of the mobile target 2.

3.3.2 If 0=CM∩Cs11 and {Q0, Q1}=CM∩Cs13

The two points P0∈CM and P1∈Cs11 are evaluated in such a way that

‖P0−P1‖=$\min_{P \in CM, Q \in Cs11}$ ‖P−Q‖

If ‖P0−P1‖<$d_{th}$ one goes to the point 3.3.1 otherwise as an estimate of the position of the mobile target 2 is selected the point between Q0 and Q1 with the greater x-coordinate (if the master node is S0 or S1) or with the lower x-coordinate (if the master node is S2 or S3).

3.3.3 If {P0, P1}=CM∩Cs11 and 0=CM∩Cs13

As an estimate of the position of the moving target 2 the point between P0 and P1 with the y-coordinate greater (if the LGV is moving forward) or the y-coordinate lower (if the LGV is moving backwards) is selected.

3.3.4 If 0=CM∩Cs11 and 0=CM∩Cs13

The two points P0∈CM and P1∈Cs11 are evaluated in such a way that

‖P0−P1‖=$\min_{P \in CM, Q \in Cs11}$ ‖P−Q‖

If ‖P0−P1‖≤$d_{th}$ one goes to point 3.3.3 otherwise, the position of the moving target 2 is settled equal to [0, 0].

B. If vPeaks11≥thvPeak and vPeaks13<thvPeak one goes to point 5, corresponding to the point 2.5 of the algorithm 1.

C. If vPeaks11<thvPeak and vPeaks13≥thvPeak one goes to point 7, corresponding to the point 2.7 of the algorithm 1.

D. If vPeaks11<thvPeak and vPeaks13<thvPeak

If vPeaks11<=vPeaks13 one goes to point 7, corresponding to the point 2.7 of the algorithm 1.

If vPeaks11>vPeaks13 one goes to point 5, corresponding to the point 2.5 of the algorithm 1.

3.4. If the first slave node does not answer

It should be evaluated CM∩Cs12 and CM∩Cs13

A. If vPeaks12≥thvPeak and vPeaks13≥thvPeak 3.4.1 If {P0, P1}=CM∩Cs12 and {Q0, Q1}=CM∩Cs13

P∈{P0, P1} and Q∈{Q0, Q1} are selected such that

‖P−Q‖=$\min_{i,j \in [0,1]}$ ‖Pi−Qj‖

The barycenter of the two points 0,5(P+Q) is considered as an estimate of the position of the moving target 2.

3.4.2 If 0=CM∩Cs12 and {Q0, Q1}=CM∩Cs13

The two points P0∈CM and P1∈Cs12 are evaluated in such a way that

‖P0−P1‖=$\min_{P \in CM, Q \in Cs11}$ ‖P−Q‖

If ‖P0−P1‖<$d_{th}$ one goes to point 3.4.1 otherwise, as an estimate of the position of the moving target 2 the point between Q0 and Q1 with the x-coordinate lower (if the master node is S0 or S1) or with the x-coordinate greater (if the master node is S2 or S3) is selected.

3.4.3 If {P0, P1}=CM∩Cs12 and 0=CM∩Cs13

As an estimate of the position of the moving target 2 the point between P0 and P1 with the x-coordinate lower (if the master node is S0 or S1) or with the x-coordinate greater (if the master node is S2 or S3) is selected.

3.4.4 If 0=CM∩Cs12 and 0=CM∩Cs13

The two points P0∈CM and P1∈Cs12 are evaluated in such a way that

‖P0−P1‖=$\min_{P \in CM, Q \in Cs11}$ ‖P−Q‖

If ‖P0−P1‖≤$d_{th}$ one goes to point 3.4.3 otherwise, the position of the moving target 2 is settled equal to [0, 0].

B. If vPeaks12>thvPeak and vPeaks13<thvPeak one goes to point 6, corresponding to the point 2.6 of the algorithm 1.

C. If vPeaks12<thvPeak and vPeaks13>thvPeak one goes to point 7, corresponding to the point 2.7 of the algorithm 1.

D. If vPeaks12<thvPeak and vPeaks13<thvPeak

If vPeaks12<=vPeaks13 one goes to point 7, corresponding to point 2.7 of the algorithm 1.

If vPeaks12>vPeaks13 one goes to point 6, corresponding to the point 2.6 of the algorithm 1.

4. Algorithm 1-A

This algorithm is similar to algorithm 1, with points 2, 3, 4, 5, 6, 7 and 8 identical to those of the algorithm 1. The point 1 works in a different manner in the algorithms explained in the foregoing, the circumference related to the master has always been taken into account. Upon analyzing the collected results, it has been verified that this is not always the best choice, since the interval estimations from the master can be wrong as those of the slave nodes. For this reason, when all the three slave nodes answer (i. e. when four interval estimations from all the nodes are available), if the value of vPeak referred to the master is lower than those of the slave nodes, the interval measure of the master is ignored.

The point 1 is then changed as follows:

If all the three slave nodes answer

If min{vPeakm, vPeaks11, vPeaks12, vPeaks13}=vPeakm then the distance estimate of the master is ignored.

4.1 If $\{P0, P1\}=Cs11 \cap Cs13$ and $\{Q0, Q1\}=Cs12 \cap Cs13$
$P \in \{P0, P1\}$ and $Q \in \{Q0, Q1\}$ are selected such that
$\|P-Q\|=\min_{i,j \in [0,1]} \|Pi-Qj\|$
$\|P-Q\|=\min_{i,j \in [0,1]} \|Pi-Qj\|$
The barycenter of the two points $0,5(P+Q)$ is considered as an estimate of the position of the moving target 2.

4.2 If $0=Cs11 \cap Cs13$ and $\{Q0, Q1\}=Cs12 \cap Cs13$
The two points $P0 \in Cs11$ and $P1 \in Cs13$ are evaluated in such a way that
$\|P0-P1\|=\min_{P \in Cs11, Q \in Cs13} \|P-Q\|$
If $\|P0-P1\|<d_{th}$ one goes to point 4.1
otherwise, as an estimate of the position of the moving target 2 the point between Q0 and Q1 with the y-coordinate greater (if the master node is S0 or S3) or the y-coordinate lower (if the master node is S1 or S2) is selected.

4.3 If $\{P0, P1\}=Cs11 \cap Cs13$ and $0=Cs12 \cap Cs13$
The two points $Q0 \in Cs12$ and $Q1 \in Cs13$ are evaluated such that
$\|Q0-Q1\|=\min_{P \in Cs12, Q \in Cs13} \|P-Q\|$
If $\|Q0-Q1\|<d_{th}$ one goes to point 4.1
otherwise, as an estimate of the position of the moving target 2 the point between P0 and P1 with the x-coordinate lower (if the master node is S0 or S1) or the x-coordinate greater (if the master node is S2 or S3) is selected.

4.4 If $0=Cs11 \cap Cs13$ and $0=Cs12 \cap Cs13$
The two points $P0 \in Cs11$ and $P1 \in Cs13$ are evaluated in such a way that
$\|P0-P1\|=\min_{P \in Cs11, Q \in Cs13} \|P-Q\|$
The two points $Q0 \in Cs12$ and $Q1 \in Cs13$ are evaluated such that
$\|Q0-Q1\|=\min_{P \in Cs12, Q \in Cs13} \|P-Q\|$
If $\|P0-P1\| \le d_{th}$ and $\|Q0-Q1\| \le d_{th}$ one goes to 4.1
If $\|P0-P1\| \le d_{th}$ and $\|Q0-Q1\| > d_{th}$ as an estimate of the position of the moving target 2, the barycenter of the two points P0 and P1, i. e. $0,5(P0+P1)$ is selected.
If $\|P0-P1\| > d_{th}$ and $\|Q0-Q1\| \le d_{th}$ as an estimate of the position of the moving target 2, the barycenter of the two points Q0 and Q1, i. e. $0,5(Q0+Q1)$ is selected.
If $\|P0-P1\| > d_{th}$ and $\|Q0-Q1\| > d_{th}$ the position of the moving target 2 is settled equal to [0, 0].

If min{vPeakm, vPeaks11, vPeaks12, vPeaks13}=vPeaks11 then the estimate of the distance of the first slave node is ignored. The localisation strategy is that explained under point 2.4 of the algorithm 1.

If min{vPeakm, vPeaks11, vPeaks12, vPeaks13}=vPeaks12 then the estimate of the distance of the second slave node is ignored. The localisation strategy is that explained under point 2.3 of the algorithm 1.

If min{vPeakm, vPeaks11, vPeaks12, vPeaks13}=vPeaks12 then the estimate of the distance of the third slave node is ignored. The localisation strategy is that explained under point 2.2 of the algorithm 1.

5. Algorithm 2-A

This algorithm is similar to the algorithm 2, but point 1 works in a manner similar to the algorithm 1-A and even ignoring the measure of the master if the corresponding value of vPeak is lower to a certain threshold.

6. Algorithm 1-F

This algorithm is similar to the algorithm 1-A, but the position estimates greater than 2 meters from the barycenter of the last three estimates are not considered.

7. Algorithm 2-F

This algorithm is similar to the algorithm 2-A, but the position estimates greater than 2 meters from the barycenter of the last three estimates are not considered.

Therefore, according to the present invention, the localisation group comprises one or more automatic guided vehicles, such as LGV or AGV, equipped with a kind of measuring system able to detect the position of other moving targets TN (persons or Forklift or manual-guided vehicles), at around LGV. In particular, such a system, for example of the UWB-type, can include 2 or more nodes, for example 3 or 4 nodes managed by a centralized processing unit on board of the LGV same, which nodes on board of the vehicle perform the function of fixed anchors integral with one another.

A group according to the present invention can locate a moving target by means of the trilateration or multilateration on the basis of the acquired distance signals or measurements, i. e. the distance signals or measurements are processed by the trilateration or multilateration.

So far as the trilateration is concerned, the distance measurement between a fixed anchor and a marker or target or tag is performed using a measure of the ToF (Time-of-flight) or ToA (time-of-arrival) based on an algorithm TWR (Two Way Ranging). The TWR algorithm provides a mechanism for the exchange of messages between anchor and tag allowing to obtain the measure of the time of flight without the need of synchronizing the oscillators of the two devices.

As regard instead the multilateration, the measure of difference of the anchor-tag distances is performed using a measure of TDOA (Time Difference of Arrivals).

The use of UltraWideBand (UWB) communications has the advantage of ensuring, thanks to the use of temporal pulses with a duration of tens of picoseconds, a considerable accuracy of localisation—up to a few centimeters in free space—which makes the wireless UWB technology significantly more effective than other wireless technologies, for example radio frequency technologies at low frequencies, WiFi or Bluetooth, which anyway could also be used as an alternative.

Therefore, as it will be appreciated, the main aspects of the invention subject matter of the present patent application are the following:

group with fixed nodes on a vehicle, which are integral with each other and which cooperate to localise another mobile node uncoupled to the group of fixed nodes integral with one another; all the nodes—both those integral with each other and the moving target—can use the same kind of wireless communication;

the target or moving target to be localised is of the active type and equipped with marker;

a system based on the idea of virtual anchors is made; to this regard, a plurality of antennas driven by a central unit (for example, at time division) can be employed, so that an antenna acts as a node for the measurement of a distance from the moving target; this approach has two advantages, namely (a) reduction of costs—antennas less expensive than full nodes—and (ii) ease of management, the processing unit on the vehicle manages a lower number of nodes;

particular realization of the above-mentioned systems via wireless technology of UWB type;

implementation of a localisation method with 4 fixed nodes integral with each other—anchors on the vehicle—with three steps for the estimation of the localisation of a moving node: (i) the discovery of the presence of a node or the moving target and its identifier; (ii) estimates of the distances between each anchor or node and the moving node; (iii) processing of such distances in a manner suitable to calculate the position of the moving node; during the third step different algorithms can be used, including for example pseudo-intersection of circumferences, other geometric algorithms, use of particle swarming optimization (PSO), etcetera;

extension of all the systems above described under the previous points for the localisation of a certain number (>1) of moving nodes (independent one with respect to the other) and uncoupled to the group of fixed nodes integral with one another.

Moreover, when dealing with the localisation of multiple moving nodes, it can be provided for the development of innovative algorithms to limit interferences—actually collisions—between transmissions from distinct targets.

Furthermore, as already above mentioned, the cooperation between the moving radar of the vehicle or vehicles and some fixed anchors (which are distributed, for example, in a warehouse) can be foreseen.

A possible cooperation can include, for example, fixed anchors able to obtain the list of the moving targets present in a given area, which list could help the moving anchors on vehicles, especially during the discovery phase.

DE102014013084A1 teaches a method and a system for operating a vehicle, in particular a vehicle without driver or an automatic guided vehicle and not a group of localisation of a target or moving target.

Moreover, in this regard it should be noted that the automatic guided vehicles of a group according to the present invention are already localised in a global way thanks to an existing tracking system, and thus the localisation of the moving targets with respect to a single vehicle allows to obtain a localisation (and a possible tracking) of the global position of the moving targets in the overall tracking system, integral to all vehicles in the system.

It should also be noted that according to the system of DE102014013084A1 two different frequency bands (LF and UHF) are used, whereas a group according to the present invention can exploit only a band of frequencies EM (mainly UWB, but even other types of frequency bands, for example WiFi or Bluetooth).

Then actually in a group according to the present invention, the automatic guided vehicle has a known positioning and localises the target as moving entity in an unknown location (to be avoided), while according to DE102014013084A1 the vehicle is in an unknown position and a location is identified, such as a charging station, which is fixed and must be reached.

It should also be considered that the markers provided at the identification stations of DE102014013084A1 are of the passive type, that is to say that the markers are activated and powered by the same interrogation radiation in LF transmitted by the AGV; furthermore as said, the localisation technique is based on the measurement of the signal power returning from the identification station, and not on the time useful for the signal to return.

In view of this, the answer times of such a marker will be very slow and even relatively inaccurate, and this is not acceptable in the case of a moving target localisation, since a target, person or manual guided vehicle, being actually movable varies continuously its position and it is therefore important to have active markers capable of providing rapid answers to avoid possible collisions.

As regards instead U.S. Pat. No. 6,522,288B1, U.S. Pat. No. 6,628,227B1 and U.S. Pat. No. 6,727,844B1, they have in common the use of localisation techniques (of mobile obstacles) with reference to manual guided vehicles (car), but do not relate to localisation groups or estimation group of the position of a moving target. Moreover, such documents, particularly U.S. Pat. No. 6,628,227B1 and U.S. Pat. No. 6,727,844B1 are mainly arranged to detect the relative position of a moving target in order to avoid collisions among vehicles. Actually, the applications of such previous documents represent a technology of the "radar" type, which recognizes each passive obstacle present in the environment.

Modifications and variants of the invention are possible within the scope of protection defined by the claims.

The invention claimed is:

1. A localisation or estimation group of the position of a moving target, such as a person or a manual guided vehicle, in a warehouse or in an area to be monitored with at least one automatic guided vehicle of said localisation group, said group being equipped with a unit for controlling the movement of the automatic guided vehicle itself, said group including at least one moving target as well as at least two first nodes for emitting and receiving signals, said first nodes being provided with respective antennas, a second node or marker positioned on said moving target, said marker including at least one antenna suitable for receiving/emitting signals in response to signals coming from the at least two first nodes for emitting and receiving signals, wherein said at least two first nodes for emitting and receiving signals are located on said at least one automatic guided vehicle, said automatic guided vehicle comprising a unit for controlling the movement of said automatic guided vehicle itself, as well as at least two first nodes for emitting and receiving signals, said at least two first nodes being provided with respective antennas, wherein said first nodes for emitting and receiving signals are at least four and are positioned in proximity to a corner of the outline of the automatic guided vehicle.

2. The localisation group according to claim 1, wherein the first nodes for emitting/receiving on the automatic guided vehicle and the marker of the moving target use electromagnetic waves of the same ultra wide band type, abbreviated to UWB, or other types of transmission signals via electromagnetic waves, such as Wi-Fi or Bluetooth.

3. The localisation group according to claim 1, wherein the antennas of said at least two first nodes for emitting and receiving signals are controlled by a number of emission/receiving units lower than the number of said first nodes.

4. The localisation group according to claim 3, wherein said emission/receiving units comprise means for performing the time division multiplexing of signals to and from said first nodes for emitting and receiving signals.

5. The localisation group according to claim 3, wherein said first nodes for emitting and receiving signals are connected to the emission/receiving units via transmission means.

6. The localisation group according to claim 3, wherein said automatic guided vehicle comprises a control unit or programmed control unit controlling said emission/receiving units, receiving detection input signals of said at least two nodes and calculating the position of said at least one target.

7. The localisation group according to claim 6, wherein said control unit or programmed control unit is comprised in the same unit for controlling the movement of the automatic guided vehicle.

8. The localisation group according to claim 1, wherein said first nodes for emitting and receiving signals are four and are positioned in proximity to a corner of the outline of the automatic guided vehicle, considering the plan view of the outline of the automatic guided vehicle approximately as a rectangle, thus allowing a more favourable geometric location of nodes on the automatic guided vehicle to perform the trilateration or multilateration or to measure the geometric position with respect to the moving target.

9. The localisation group according to claim 1, comprising at least two first nodes with the respective antennas at fixed points of the warehouse or area.

10. The localisation group according to claim 1, comprising a device for controlling in a centralized manner connected to said at least one automatic guided vehicle and arranged to manage the movement of said at least one automatic guided vehicle.

11. The localization group according to claim 1, wherein said second node or marker is of the active type, i. e. it is always ready in reception for receiving any interrogating signals coming from each vehicle.

12. The localization group according to claim 11, wherein said second node or marker is supplied by a suitable electric supply system, for example one or more batteries mounted on board or borne by said moving target.

13. A vehicle according to claim 1, wherein said at least two first nodes for emitting and receiving signals use electromagnetic waves of the same ultra wide band type, or other types of transmission signals via electromagnetic waves, such as Wi-Fi or Bluetooth.

14. A vehicle according to claim 1, wherein said antennas of said at least two first nodes for emitting and receiving signals are controlled by a number of emission and receiving units lower than the number of said first nodes.

15. A vehicle according to claim 14, wherein said emission and receiving units comprise means for performing the time division multiplexing of signals to and from said first nodes for emitting and receiving signals.

16. A localisation method of a moving target via a localisation or estimation group of the position of a moving target, such as a person or a manual guided vehicle, in a warehouse or in an area to be monitored with at least one automatic guided vehicle of said localisation group, said group being equipped with a unit for controlling the movement of the automatic guided vehicle itself, said group including at least one moving target as well as at least two first nodes for emitting and receiving signals, said first nodes being provided with respective antennas, a second node or marker positioned on said moving target, said marker including at least one antenna suitable for receiving/emitting signals in response to signals coming from the at least two first nodes for emitting and receiving signals, said at least two first nodes for emitting and receiving signals being located on said at least one automatic guided vehicle, comprising the following steps:
  acquiring the signals or measures of the distance of said at least two first nodes from said at least one moving target; and
  processing the signals of the distance to obtain the position estimate of said at least one moving target,
  wherein said processing step of the signals of the distance includes the following steps:
    assigning to one node the role of master node and to at least another node the role of slave node;
    setting all the nodes to the sleeping state;
    activating the master node;
    sending signals from said master node to the node network of said warehouse until it receives a response from the marker of a moving target;
    once said master node has received a response from a moving target, setting said master node to the sleeping state and activating at least one slave node;
    sending signals from said slave node to the node network of said warehouse until it receives a response from the marker of said moving target that had responded to said master node;
    setting said slave node to the sleeping state;
    repeating the procedure for all the remaining slave nodes and storing all the signals of the responses received from the master node and from all the slave nodes; and
    processing said stored signals to obtain the position estimate of said at least one moving target.

17. The method according to claim 16, wherein said signals or measures of the distance are processed by means of trilateration or multilateration.

18. A localisation method of a moving target via a localisation or estimation group of the position of a moving target, such as a person or a manual guided vehicle, in a warehouse or in an area to be monitored with at least one automatic guided vehicle of said localisation group, said group being equipped with a unit for controlling the movement of the automatic guided vehicle itself, said group including at least one moving target as well as at least two first nodes for emitting and receiving signals, said first nodes being provided with respective antennas, a second node or marker positioned on said moving target, said marker including at least one antenna suitable for receiving/emitting signals in response to signals coming from the at least two first nodes for emitting and receiving signals, said at least two first nodes for emitting and receiving signals being located on said at least one automatic guided vehicle, comprising the following steps:
  acquiring the signals or measures of the distance of said at least two first nodes from said at least one moving target; and
  processing the signals of the distance to obtain the position estimate of said at least one moving target, and further comprising a step of identification of the targets present within a working range of a master node, said identification step being carried out before said steps that provide for acquiring, computing and processing.

19. A localisation method of a moving target via a localisation or estimation group of the position of a moving target, such as a person or a manual guided vehicle, in a warehouse or in an area to be monitored with at least one automatic guided vehicle of said localisation group, said group being equipped with a unit for controlling the movement of the automatic guided vehicle itself, said group including at least one moving target as well as at least two first nodes for emitting and receiving signals, said first nodes being provided with respective antennas, a second node or marker positioned on said moving target, said marker including at least one antenna suitable for receiving/emitting signals in response to signals coming from the at least two first nodes for emitting and receiving signals, said at least two first nodes for emitting and receiving signals being located on said at least one automatic guided vehicle, comprising the following steps:
  acquiring the signals or measures of the distance of said at least two first nodes from said at least one moving target; and
  processing the signals of the distance to obtain the position estimate of said at least one moving target, wherein said signal processing for obtaining the position estimate of said at least one target is carried out by intersecting circumferences with their centre at the position of said at least two nodes, said circumferences being ideally traced by the signals emitted by each node.

* * * * *

UNITED STATES PATENT AND TRADEMARK OFFICE
CERTIFICATE OF CORRECTION

PATENT NO. : 10,156,853 B2
APPLICATION NO. : 15/088734
DATED : December 18, 2018
INVENTOR(S) : Stefania Monica et al.

It is certified that error appears in the above-identified patent and that said Letters Patent is hereby corrected as shown below:

On the Title Page

Please correct Assignee name to read as follows:
"ELETTRIC 80 S.p.A."

Signed and Sealed this
Twenty-ninth Day of January, 2019

Andrei Iancu
*Director of the United States Patent and Trademark Office*